(12) United States Patent
Bornmann et al.

(10) Patent No.: US 7,764,856 B2
(45) Date of Patent: Jul. 27, 2010

(54) DEVICE FOR INJECTING LIGHT INTO AN OPTICAL WAVE GUIDE

(75) Inventors: Volker Bornmann, Ilmenau (DE); Christoph Schaeffel, Ilmenau (DE); Ludwig Bergann, Berlin (DE); Ralf Malz, Jena (DE)

(73) Assignee: LASOS Lasertechnik GmbH, Jena (DE)

( * ) Notice: Subject to any disclaimer, the term of this patent is extended or adjusted under 35 U.S.C. 154(b) by 0 days.

(21) Appl. No.: 12/426,648

(22) Filed: Apr. 20, 2009

(65) Prior Publication Data

US 2009/0263085 A1   Oct. 22, 2009

Related U.S. Application Data

(63) Continuation of application No. PCT/DE2007/001869, filed on Oct. 19, 2007.

(30) Foreign Application Priority Data

Oct. 20, 2006   (DE) .................. 10 2006 049 597

(51) Int. Cl.
*G02B 6/00* (2006.01)
*G02B 6/36* (2006.01)

(52) U.S. Cl. .............. 385/134; 385/136; 385/137; 385/88; 385/90; 385/92

(58) Field of Classification Search ............ 385/88, 385/90–92, 136, 137, 134, 52; 248/560, 248/582, 583, 603, 604
See application file for complete search history.

(56) References Cited

U.S. PATENT DOCUMENTS

| | | |
|---|---|---|
| 4,087,155 A | 5/1978 | Deacon |
| 4,296,999 A | 10/1981 | Mead |
| 4,691,586 A | 9/1987 | Van Leijenhorst et al. |
| 5,029,791 A | 7/1991 | Ceccon et al. |
| 5,673,348 A | 9/1997 | Ziegler et al. |
| 6,975,799 B2 * | 12/2005 | Kim et al. ............... 385/52 |
| 7,286,735 B1 * | 10/2007 | Burn, III ............... 385/52 |
| 2003/0147587 A1 * | 8/2003 | Chao et al. ............ 385/34 |

FOREIGN PATENT DOCUMENTS

| | | |
|---|---|---|
| EP | 0 140 821 A2 | 5/1985 |
| EP | 0 348 117 A2 | 12/1989 |
| EP | 0 583 568 A1 | 2/1994 |
| EP | 0 708 347 A1 | 4/1996 |
| WO | WO 92/02837 | 2/1992 |

* cited by examiner

*Primary Examiner*—Charlie Peng
*Assistant Examiner*—Robert Tavlykaev
(74) *Attorney, Agent, or Firm*—Muncy, Geissler, Olds & Lowe, PLLC

(57) ABSTRACT

A device for injecting light into an optical wave guide orients a focused light beam using a manipulator. The manipulator includes an adjusting plate with an outer part, an inner part, and two spring arrangements between the outer part and the inner part that are independently adjustable along two coordinate axes, each spring arrangement having a parallel spring arrangement guiding parallel to a certain direction, and a preliminary spring mounted in series, a fixing screw, and an axially elastic fixing disk. The inner part can be moved in the X direction and in the Y direction, and the fixing disk can be pressed into the adjusting plate by the fixing screw screwed into the housing part, in the direction of the passage of the beam, such that the adjusted position of the inner part is fixed.

9 Claims, 2 Drawing Sheets

DEVICE FOR INJECTING LIGHT INTO AN OPTICAL WAVE GUIDE

This nonprovisional application is a continuation of International Application No. PCT/DE2007/001869, which was filed on Oct. 19, 2007, and which claims priority to German Patent Application No. 10 2006 049 597.7, which was filed in Germany on Oct. 20, 2006, and which are both herein incorporated by reference.

BACKGROUND OF THE INVENTION

1. Field of the Invention

The present invention relates to a device for injecting light into an optical wave guide, by means of which a focused light beam is aligned by a manipulator, the injection end of the optical wave guide to be coupled being connected to an optical system. Via such a device, the system is adjusted to maximum injection efficiency, i.e., maximum transmission efficiency of the laser beam into the optical wave guide and fixing of the adjusted positions obtained during coupler adjustment, so that these positions remain permanently stable.

2. Description of the Background Art

Methods for transmitting information and energy by conducting light via optical fibers have been known for approximately 40 years.

Transmission systems of this type are based on optical fibers made of silica glass or of other suitable materials, having a radially variable refractive index curve and shielding cladding for the purpose of obtaining optical wave guides along which light energy may be conducted in a controlled manner. The optical fibers are extremely thin (<0.01 mm core diameter) and must be connected to light sources and receivers in a functionally reliable manner having few transmission losses. The best possible coupling between two fibers is achieved by placing the smoothly polished ends of the fibers to be coupled flat against one another. This ideal state is achievable only using high-precision equipment and is poorly suited for practical applications for cost reasons. Designs of this type are therefore not suitable for detachable connections.

For the purpose of detachably coupling a light beam transmission system, a method is know for injecting a collimated beam into an optical wave guide using focusing lenses or focusing lens systems.

To achieve an extremely low-loss transmission at a fiber coupling point, it is necessary to bring the axis of the incoming light beam into highly precise axial alignment with the axis of the optical conductor.

Different approaches to this problem are known.

A plug connector is known from U.S. Pat. No. 4,087,155, in which the fibers are coupled without an objective being connected therebetween. The fiber ends each rest between three elastically mounted, movable bearings.

In U.S. Pat. No. 4,296,999, the fiber coupling is described on the basis of two precisely coaxially aligned couplers, the lens-fitted fiber ends being movable for the purpose of focusing in the Z direction.

A coupling device is also known according to DE 689 22 789 T2, by means of which a precise adjustment of the beam bundle is to be achieved by an apparatus in which the inclination of the fiber arrangement is adjusted relative to a spherical lens.

A device for the X/Y positioning of an optical element is known from U.S. Pat. No. 5,029,791, in which movement in two coordinate directions is made possible by screw mechanisms.

An arrangement for connecting and aligning two optical components is specified in EP 708 347 A1, which corresponds to U.S. Pat. No. 5,673,348, in which the positioning precision is achieved by a differential thread.

Precise, low-friction guidance and precise fixing of the components are not achievable by these arrangements.

A holding device for optical components is further described in WO 92/02837 A1, this device including a mounting plate that has a spring arrangement that enables adjustment in two coordinate directions.

An arrangement for fine-adjustment of a component in the X/Y direction is specified in U.S. Pat. No. 4,691,586, in which a clearance-free adjusting movement is made possible by multiple parallel spring arrangements.

The precise movements required for injecting light into an optical wave guide, having three translatory and one rotatory degree of freedom, are not achievable by these arrangements.

The fiber couplers known from the related art make it possible to perform all necessary adjusting movements to the fibers. However, these principles have the disadvantage that the beam adjustment is very time-consuming, and corresponding experience is required because both the angular adjustment and the parallel movement in the known approaches take place within the X/Y plane, using the same adjusting means, and the different degrees of freedom are therefore not adjustable independently of each other. Consequently, residual errors in the adjustment must frequently be taken into account in order to shorten the adjustment operations.

SUMMARY OF THE INVENTION

It is therefore an object of the present invention to provide a device of the type stated above, which permits simple and precise adjustment to maximum injection efficiency while injecting light into optical wave guides by a manipulator and enables the permanent fixing of the adjusted positions obtained during coupler adjustment.

In the case of the device according to the invention, the focusing objective is precisely positioned separately in the X and Y directions by a manipulator, a gear reduction being carried out by a spring-actuated mechanism for the purpose of improving the adjustment sensitivity. The coaxially situated optical wave guide may be precisely positioned in the Z direction as well as to enable rotation around the Z axis. All adjusted positions are permanently fixed.

The manipulator includes an adjusting plate that has an inner part and an outer part, which are movable independently of each other in two coordinate directions, the movements each being guided by parallel spring arrangements and actuated by precision screw mechanisms. The inner part accommodates the optical system of the optical wave guides to be connected. The outer part is situated in a two-part housing part, in whose detachable part the outer part rests axially and in whose fixed part the outer part, together with an axially elastic fixing disk, is accommodated in a fitting component, a fixing screw pressing the fixing disk and the adjusting plate against the detachable housing part and fixing the adjusted position of the inner part.

The device includes a housing that may be designed as a single piece or have a fixed housing part and a detachable housing part.

According to an embodiment, the fixing disk has pairs of radial elastic slots extending outward from an inner bore hole.

To adjust and fix its axial position, the detachable housing part can have a guide in the axial direction which merges with a conical threaded connector onto which a clamping ring having an inner cone may be screwed. A sliding member can be situated in a longitudinally slidable manner inside the guide, at least one guide pin passing from the outside through radial elongated holes in the base of the housing part and engaging with an elongated hole running at a defined angle in the sliding member for the purpose of precisely adjusting the sliding member, and the guide pin being accommodated by a swivel mounted in the base. The degree of rotational freedom of the sliding member is blocked through fixing by means of an alignment pin that is movable longitudinally in the guide tube grooves.

A fiber stop and a journal sleeve, which are used for mounting a rotary base, are suitably situated in alignment bore holes on the beveled side of the sliding member, the rotary base, in turn, being provided with a screw connection of the optical fiber cable. A fiber alignment tube for accommodating an end of an optical fiber may be situated in the journal sleeve. To fix the position of the adjusted rotation angle of the fiber connection by means of the rotary base, clamping screws are provided which extend from the rotary base through radial elongated holes into threaded bore holes in the sliding member, by means of which the rotary base and the sliding member may be fixed together in a non-positive manner.

The exemplary embodiments of the invention include a number of advantages, for example, the generated light is transmitted at maximum injection efficiency into the optical wave guide by an optical system that is adjustable by a manipulator, the adjusted positions obtained during coupler adjustment remaining permanently fixed; precise and clearance-free adjusting movements, which are separated from each other and therefore do not influence each other, are made possible by the spring arrangements acting in the X and Y directions; and/or due to the pressing action of the adjusting plate by means of the fixing disk upon completion of the adjustment operations, the position obtained is maintained independently of setting elasticities in the precision screw mechanisms.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
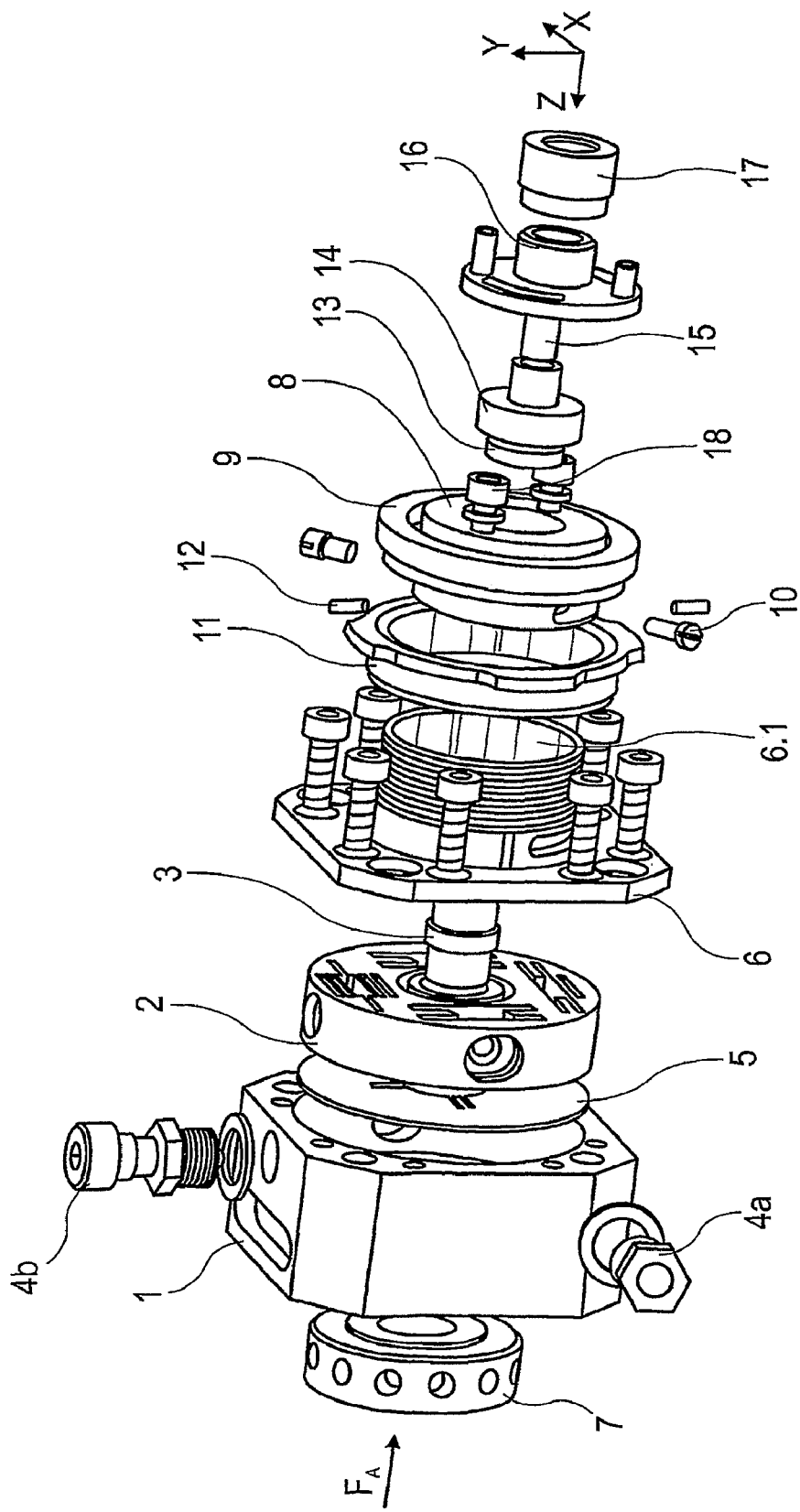
FIG. 1 shows a perspective view of an assembly of the overall device, according to an embodiment of the present invention.

As shown in FIG. 1, a housing part 1 accommodates an adjusting plate 2, which is used to move an optical system 3 that is axially fixed in the Z direction in adjusting plate 2. Adjusting plate 2 includes series-connected spring arrangements, each adjustable in the X and Y directions, one being designed as a parallel spring arrangement $2ax$ and $2ay$ having directionally parallel guidance, and the other being designed as preliminary springs $2bx$ and $2by$, with each of which a precision spring mechanism $4a$ and $4b$ engages in the main deformation direction, the spring mechanisms being situated in housing part 1 in a radially symmetrical manner in relation to preliminary springs $2bx$ and $2by$.

The spring arrangements acting in the X and Y directions are nested with each other so that the center of adjusting plate 2 supporting the objective may be moved independently in the relevant coordinates in a linear and clearance-free manner. In addition to adjusting plate 2, a fixing disk 5 is situated in the axial direction toward housing part 1. Fixing disk 5 is provided with an inner bore hole as a passage for the beam and preferably has pairs of radial, elastic slots that extend outward therefrom and are each offset by 90°.

To maintain the guidance functions, adjusting plate 2 and fixing disk 5 are situated in housing part 1 in such a way that only the edge zones are fixed by fitting and a clamping component and in such a way that the center of adjusting plate 2 supporting the objective may be moved linearly in the X and Y directions. Housing part 6 closes housing part 1.

For the purpose of fixing the position of the center of adjusting plate 2 supporting the objective, a pressing force $F_A$ is applied to fixing disk 5 by means of a fixing screw 7, which also has an axial bore hole as a passage for the beam and is introduced into housing part 1 by an axial threaded bore hole. After adjustment of optical system 3, using precision screw mechanisms $4a$ and $4b$, the defined position is thus maintained by pressing adjusting plate 2 via fixing screw 5. For this purpose, fixing screw 7 presses fixing disk 5 against housing parts 1 and 6 so that the position of adjusting plate 2 is maintained independently of setting elasticities in precision screw mechanisms $4a$ and $4b$.

On its side facing away from the screw-on surface, housing part 6 has a tubular guide that is slotted in the direction of the Z axis and is reinforced in the base, into which two radial elongated holes are introduced symmetrically, the guide merging at one end with a threaded connector having a conical overwinding. This arrangement is used to accommodate, in a longitudinally movable manner (in the Z direction), a sliding member 8 provided with an axial bore hole (to allow the passage of light).

For the purpose of circumferential precision clamping of sliding member 8 in the alignment cylinder of housing part 6, a clamping ring 9, which may be screwed onto the threaded connector having an inner cone on the threaded connector segmented by slots, generates radial clamping forces that fix the Z position of sliding member 8.

Precision positioning of sliding member 8 in the Z direction is achieved by the fact that at least one guide pin 10 passes from the outside through radial elongated holes in the base of the guide of housing part 6 and engages with an elongated hole running at a defined angle in sliding member 8, guide pin 10 being accommodated by pivot 11 mounted in the base.

A rotation at pivot 11 via permanently introduced guide pin 10 causes guide pin 10 guided in the elongated hole in the base to press against a bevel in an elongated hole introduced at a defined angle in sliding member 8 and thereby produce a longitudinal movement of sliding member 8, the degree of rotational freedom of the sliding member being blocked by fixing, using an alignment pin 12 that is movable longitudinally (in the Z direction) in the guide flange grooves.

On the side of sliding member 8 that is beveled (in the fiber connecting direction), fiber stop 13 and journal sleeve 14 are introduced into alignment bore holes for mounting rotary base 16, which, in turn, supports screw connection 17 of an optical fiber cable.

A fiber alignment tube 15 is introduced into journal sleeve 14 for accommodating an end of an optical cable. Fiber stop 13 is used to fix the position of the cable end and to locate the functionally correct rotational position of the fibers.

Clamping screws 18, which are used to screw rotary base 16 to sliding member 8, fix the rotational position set by means of rotary base 16.

Figure 2:
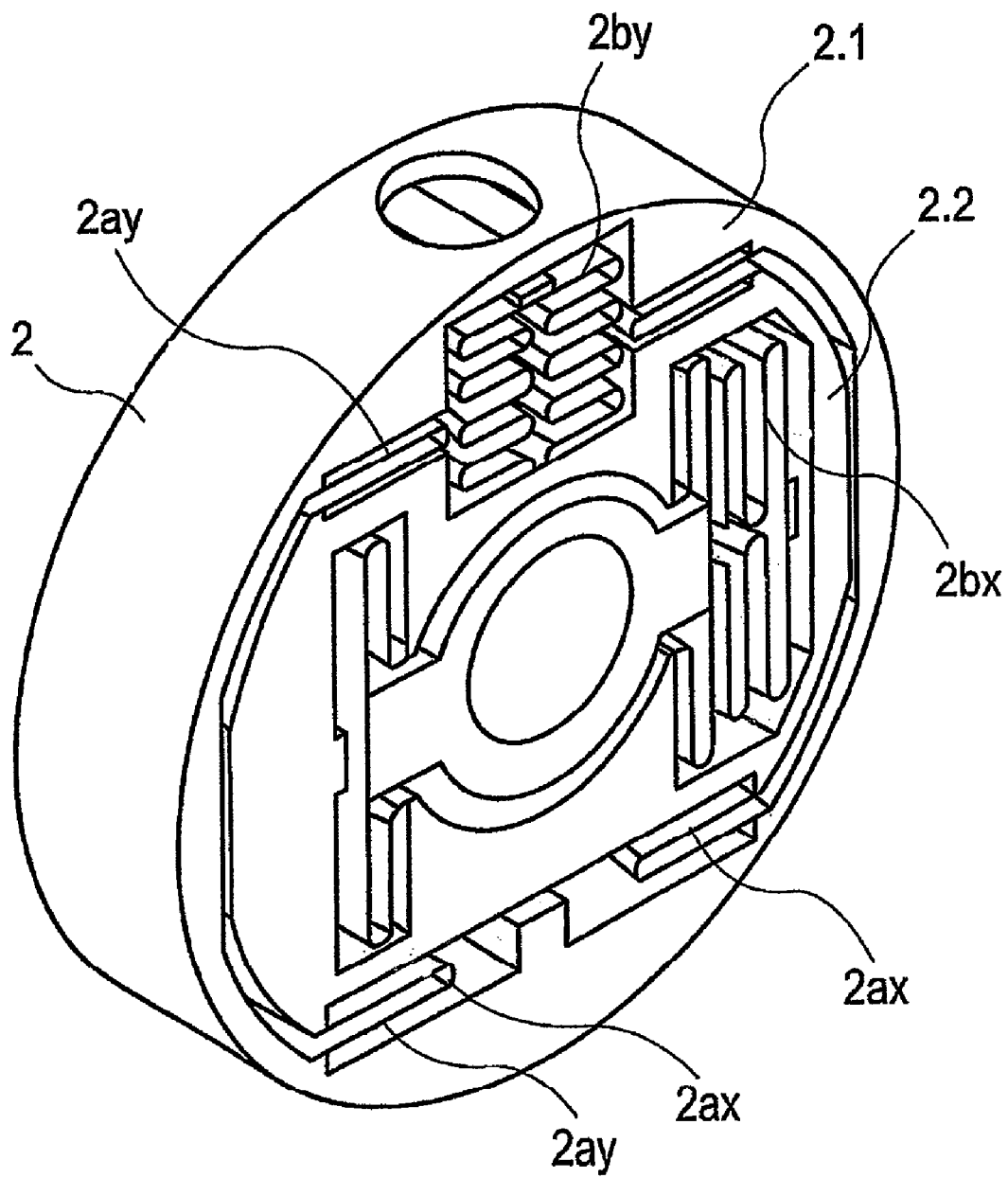
FIG. 2 shows an adjusting plate having spring joint arrangements, according to an embodiment of the present invention.

FIG. 2 shows adjusting plate 2, including its spring-actuated mechanisms. The central bore hole is used to accommodate optical system 3 and is located in a segment that is guided in the X and Y directions by crossed parallel spring arrangements, the particular preliminary springs provided in series thereto preferably represent a coordinated, sensitive adjustment arrangement according to the Michelson principle. The series-connected arrangement in the X direction includes preliminary spring 2$bx$ and parallel spring 2$ax$ and, like in the Y direction, preliminary spring 2$by$ and parallel spring 2$ay$ form the mechanical stage arrangement having a gear reduction of the spring-actuated mechanism, which may be actuated by associated precision screw mechanisms 4$a$ and 4$b$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for injecting light into an optical wave guide, which is aligned by a manipulator relative to a focused light beam, an injection end of the optical wave guide to be coupled being connected to an optical system, the device comprising:
 a manipulator having an adjusting plate, which has an outer part, an inner part, and two spring arrangements that are situated between the outer part and the inner part and are independently adjustable in two coordinate directions, each spring arrangement including a parallel spring arrangement having directionally parallel guidance and a preliminary spring connected in series thereto;
 a fixing screw introduced into a housing via an axial threaded bore hole; and
 an axially elastic fixing disk,
 wherein the inner part is configured to be adjustable in an X and Y direction,
 wherein the inner part is configured to receive the optical system, which is connected to the optical wave guide that is to be coupled, and
 wherein the fixing disk is configured to be pressed into the adjusting plate by the fixing screw screwed into the housing in a direction of a beam passage such that an adjusted position of the inner part is fixed.

2. The device according to claim 1, wherein the housing comprises a fixed housing part and a detachable housing part.

3. The device according to claim 2, further comprising precision screw mechanisms, each of which engages with the preliminary springs through an opening into the outer part, the precision screw mechanisms being situated on the housing.

4. The device according to one claim 2, wherein the axially elastic fixing disk, together with the outer part, is accommodated in a positionally fixed manner in the fixed housing part.

5. The device according to claim 1, wherein the fixing disk has pairs of radial, elastic slots that extend outward from an inner bore hole.

6. The device according to claim 2, wherein the detachable housing part has a slotted tubular guide flange merging with a conical threaded connector onto which a clamping ring having an inner cone is screwed, and wherein a sliding member is situated in a longitudinally movable manner inside the slotted tubular guide flange.

7. The device according to claim 6, wherein at least one guide pin passes through radial elongated holes in a base of the guide flange of the detachable housing part and engages with an elongated hole running at a defined angle in the sliding member, the at least one guide pin being accommodated by a pivot mounted in the base and a longitudinally movable alignment pin being situated in guide flange grooves.

8. The device according to claim 6, wherein the sliding member has a beveled side, in which a fiber stop and a journal sleeve are situated by alignment bore holes, the fiber stop and journal sleeve facilitating a mounting of a rotary base, which supports a screw connection of an optical fiber cable.

9. The device according to claim 8, wherein a fiber alignment tube is situated in the journal sleeve for accommodating an end of the optical cable, and clamping screws are provided to fix an adjusted rotational position of the fiber connection by the rotary base, the clamping screws extending through radial elongated holes from the rotary base into threaded bore holes of the sliding member via which the rotary base together with the sliding member is fixed in a non-positive manner.

* * * * *